US012659196B2

(12) United States Patent
Xiao et al.

(10) Patent No.: US 12,659,196 B2
(45) Date of Patent: Jun. 16, 2026

(54) DATA PROCESSING METHOD, DATA PROCESSING DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventors: Han Xiao, Dongguan (CN); Wenqiang Tian, Dongguan (CN); Wendong Liu, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 31 days.

(21) Appl. No.: 18/644,369

(22) Filed: Apr. 24, 2024

(65) Prior Publication Data

US 2024/0275643 A1     Aug. 15, 2024

Related U.S. Application Data

(63) Continuation of application No. PCT/CN2021/127990, filed on Nov. 1, 2021.

(51) Int. Cl.
*G06N 3/094*      (2023.01)
*H04L 25/02*      (2006.01)

(52) U.S. Cl.
CPC ......... *H04L 25/0254* (2013.01); *G06N 3/094* (2023.01)

(58) Field of Classification Search
CPC ............................ H04L 25/0254; G06N 3/094

USPC ......................................................... 375/262
See application file for complete search history.

(56) References Cited

U.S. PATENT DOCUMENTS

| | | | |
|---|---|---|---|
| 11,922,320 B2 * | 3/2024 | Jaipuria | ................. G06N 3/094 |
| 2022/0383090 A1 * | 12/2022 | Inoue | .................... G06F 18/214 |

FOREIGN PATENT DOCUMENTS

| | | |
|---|---|---|
| AU | 2021101336 A4 | 5/2021 |
| CN | 110289927 A | 9/2019 |
| CN | 110875790 A | 3/2020 |
| CN | 111355675 A | 6/2020 |
| CN | 112422208 A | 2/2021 |
| CN | 113381952 A | 9/2021 |

OTHER PUBLICATIONS

Mehran Soltani et al.Deep Learning-Based Channel Estimation, date:Feb. 19, 2019 (4 pages).
Chao-Kai Wen et al. Deep Learning for Massive MIMO CSI Feedback, date: Mar. 22, 2018 (4 pages).
Ishaan Gulrajani et al.Improved Training of Wasserstein GANs[J], preprintarXiv:1704. 00028, 2017, date: Mar. 31, 2017 (11 pages).

(Continued)

*Primary Examiner* — Dominic D Saltarelli
(74) *Attorney, Agent, or Firm* — Ladas & Parry LLP

(57)          ABSTRACT

A data processing method, a data processing device, and a computer-readable storage medium are disclosed. The data processing method includes generating first channel data by using a channel generator, wherein the channel generator is included in a generative adversarial network (GAN), and the GAN further includes a channel discriminator configured to discriminate the first channel data according to real channel data.

12 Claims, 10 Drawing Sheets first channel data is generated by using a channel generator — S810 the GAN is trained according to a discrimination result of the channel discriminator — S820

(56)　　　　　References Cited

OTHER PUBLICATIONS

International Search Report, International Patent Application No. PCT/CN2021/127990, mailed Mar. 28, 2022 (14 pages).

Extended European search report issued by the EPO for Application No. EP21962025.9 dated Jul. 8, 2025.

Massive MIMO CSI Feedback Based on Generative Adversarial Network; Bassant Tolba et al.; IEEE Communications Letters, vol. 24, No. 12, Dec. 2020.

\* cited by examiner

100

Input Layer 310    Hidden Layer 320    Output Layer 330

Input Layer 410    Convolutional Layer 420    Pooling Layer 430    Convolutional Layer 420    Pooling Layer 430    Fully Connected Layer 440    Output Layer 450 first channel data is generated by using a channel generator — S810 the GAN is trained according to a discrimination result of the channel discriminator — S820

1

DATA PROCESSING METHOD, DATA PROCESSING DEVICE, AND COMPUTER-READABLE STORAGE MEDIUM

CROSS REFERENCE TO RELATED APPLICATIONS

The present application is a continuation-application of International (PCT) Patent Application No. PCT/CN2021/127990, filed on Nov. 1, 2021, the entire contents of which are hereby incorporated by reference in its entirety.

TECHNICAL FIELD

The present disclosure relates to the field of communication, and in particular to a data processing method, a data processing device, and a computer-readable storage medium.

BACKGROUND

With the development of technology, a traditional channel modeling method (based on mathematical modeling) has encountered many challenges. For example, a large-scale antenna, an underwater communication, a millimeter wave, etc., may bring a complex channel environment, and the traditional channel modeling method is difficult to depict the complex channel environment well.

Artificial intelligence (AI) may solve the above-mentioned problem to some extent. However, an AI-based channel modeling method requires a large amount of channel data to be supported. Channel data is obtained by requiring to manually use specialized and expensive equipment in a real environment. Therefore, the AI-based channel modeling method may consume a large amount of manpower, material resources, financial resources, and time.

SUMMARY OF THE DISCLOSURE

According to a first aspect, the present disclosure provides a data processing method, including: generating first channel data by using a channel generator, wherein the channel generator is included in a generative adversarial network (GAN), and the GAN further includes a channel discriminator configured to discriminate the first channel data according to real channel data.

According to a second aspect, the present disclosure provides a data processing device, including: a processor, a memory, and a communication interface; where the memory is configured to store one or more computer programs, and the processor is configured to call the computer program stored in the memory to cause a terminal device to perform the method described in the first aspect.

According to a third aspect, the present disclosure provides a computer-readable storage medium configured to store a computer program, and the computer program is capable of causing terminal device to perform some or all steps of the method described in the first aspect.

2

Figure 2:
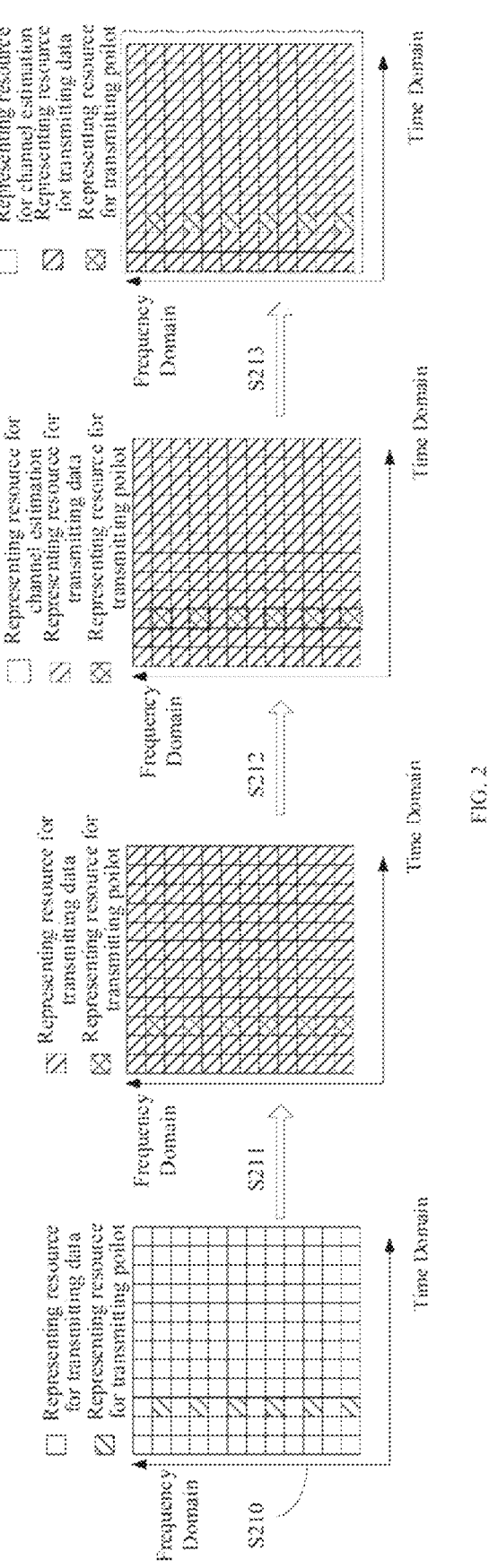

FIG. 2 is a schematic diagram of channel estimation and signal recovery according to some embodiments of the present disclosure.

Figure 3:
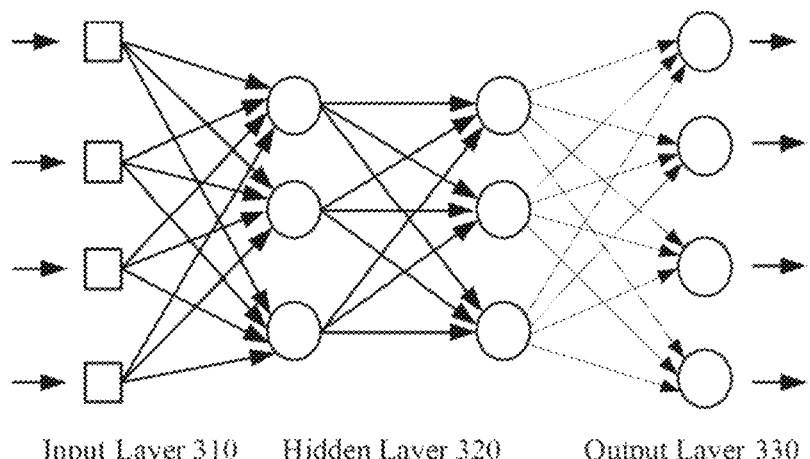

FIG. 3 is a schematic structural diagram of a neural network according to some embodiments of the present disclosure.

Figure 4:
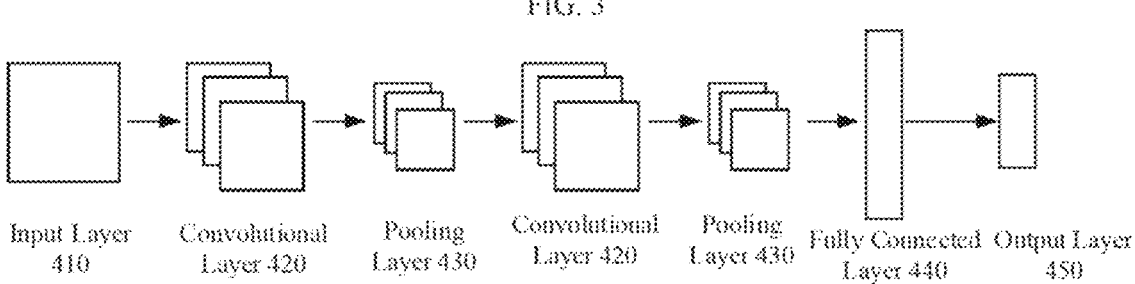

FIG. 4 is a schematic structural diagram of a convolutional neural network according to some embodiments of the present disclosure.

Figure 5:
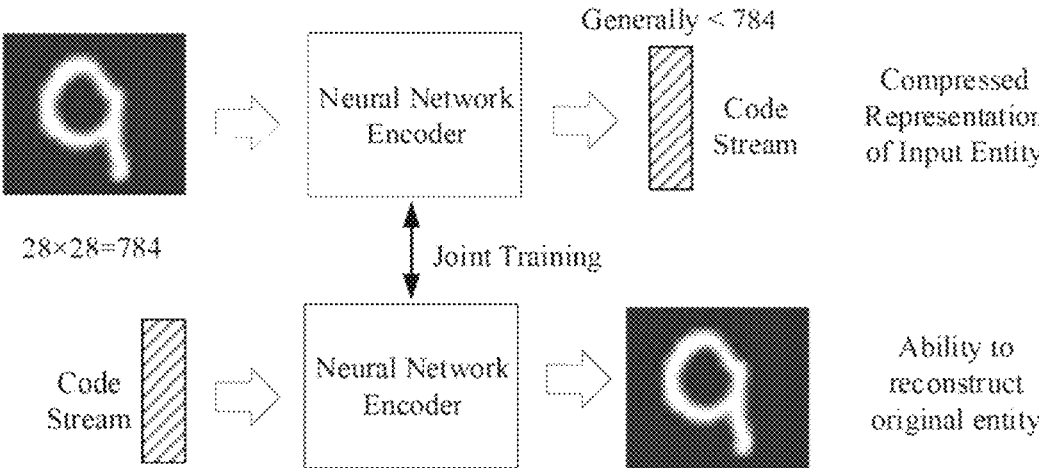

FIG. 5 is a schematic diagram of an autoencoder-based image compression process.

Figure 6:
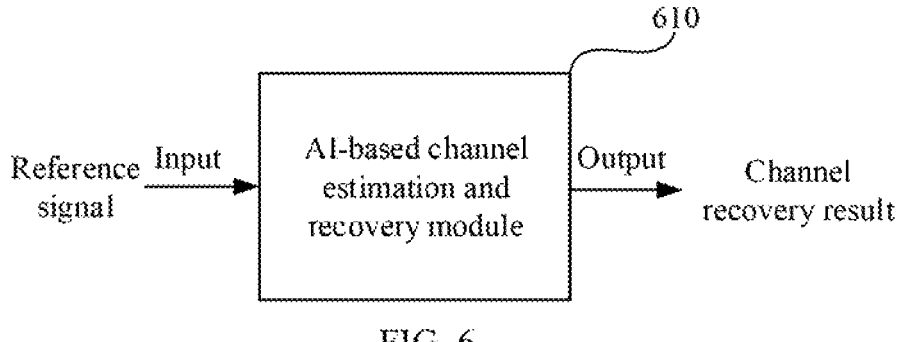

FIG. 6 is a schematic diagram of an AI-based channel estimation and recovery process.

Figure 7:
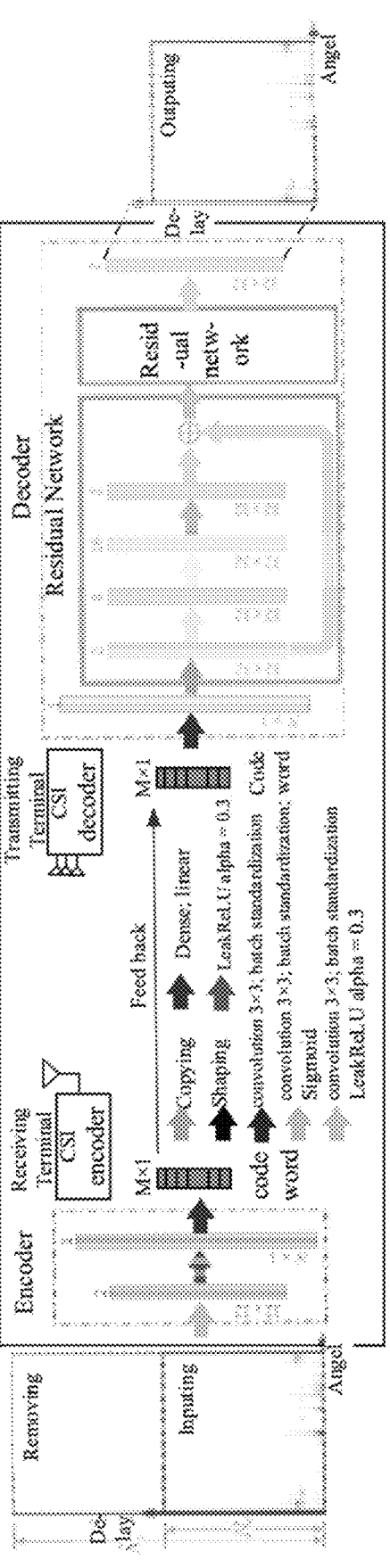

FIG. 7 is a schematic diagram of an AI-based channel feedback process.

Figure 8:
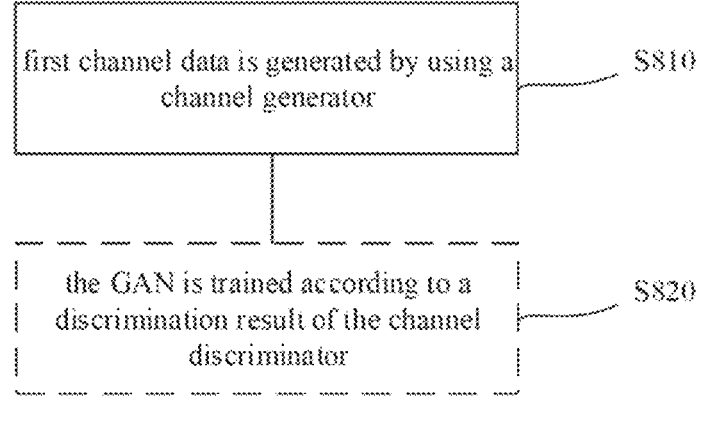

FIG. 8 is a schematic flowchart of a data processing method according to some embodiments of the present disclosure.

Figure 9:
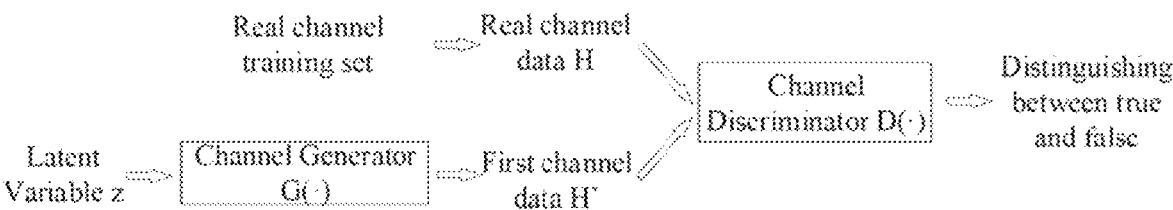

FIG. 9 is an overall framework of a data processing method according to some embodiments of the present disclosure.

Figure 10:
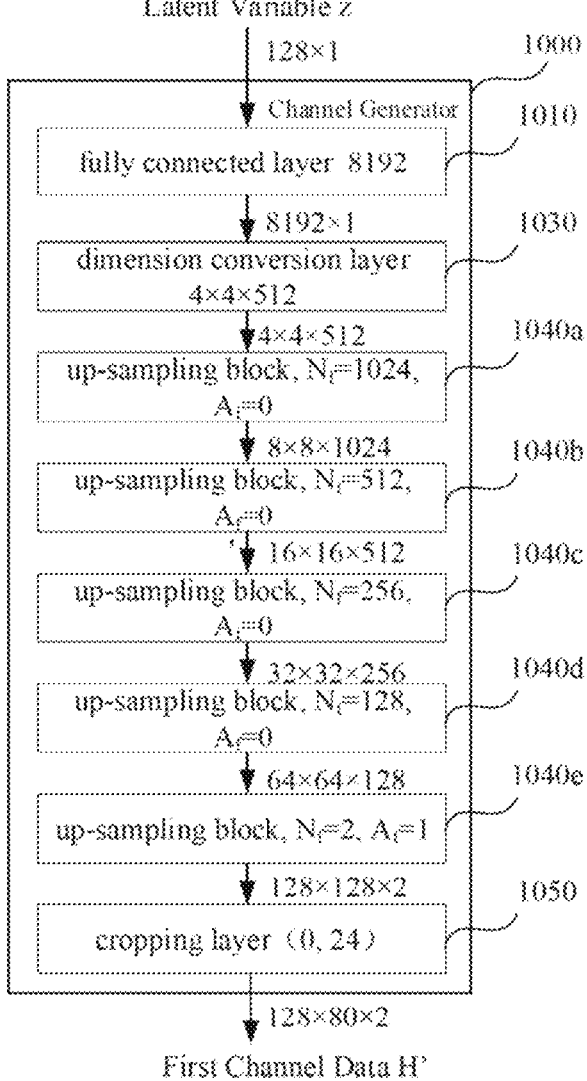

FIG. 10 is a schematic structural diagram of a channel generator according to some embodiments of the present disclosure.

Figure 11:
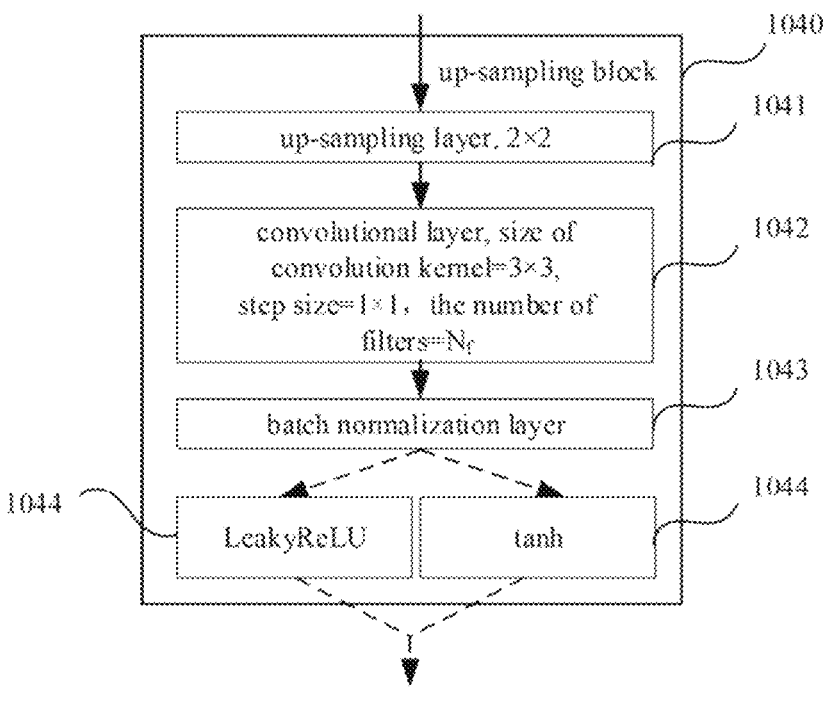

FIG. 11 is a schematic structural diagram of an up-sampling block according to some embodiments of the present disclosure.

Figure 12:
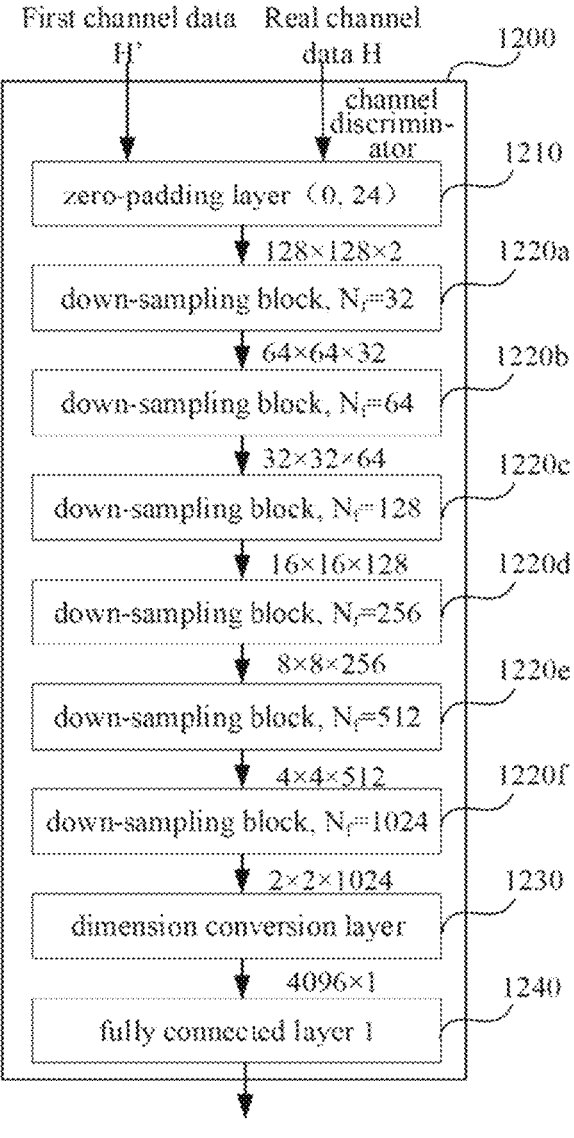

FIG. 12 is a schematic structural diagram of a channel discriminator according to some embodiments of the present disclosure.

Figure 13:
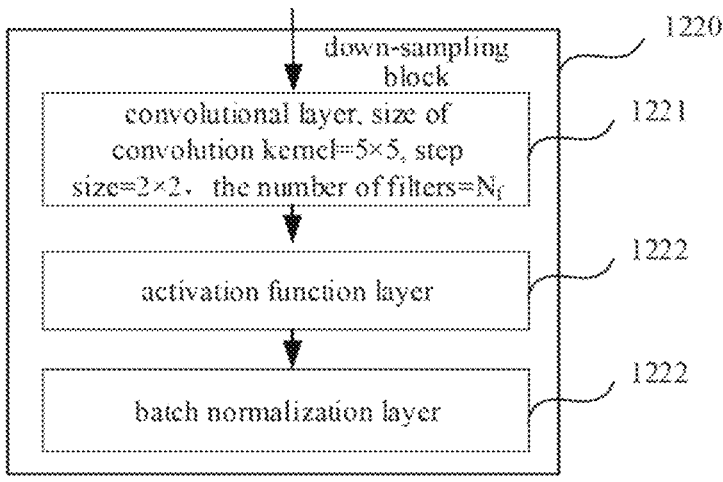

FIG. 13 is a schematic structural diagram of a down-sampling block according to some embodiments of the present disclosure.

Figure 14:
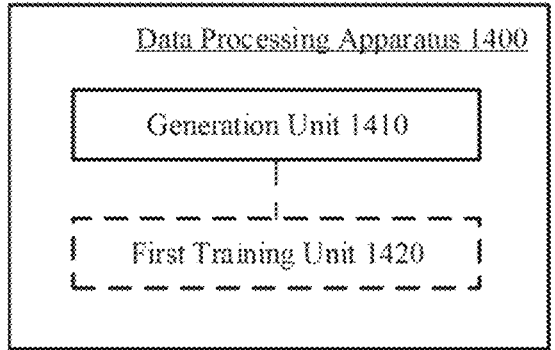

FIG. 14 is a schematic structural diagram of a data processing apparatus according to some embodiments of the present disclosure.

Figure 15:
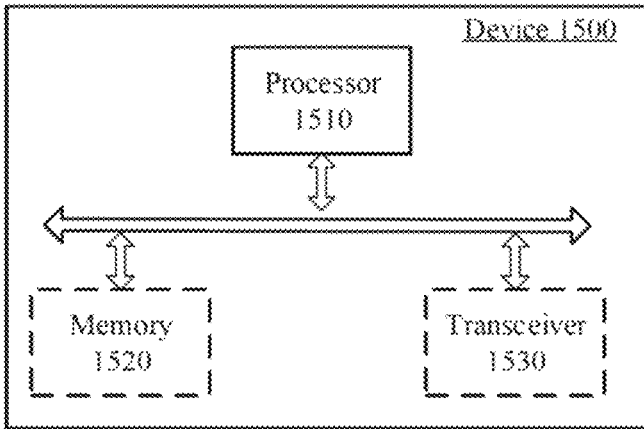

FIG. 15 is a schematic structural diagram of a device for data processing according to some embodiments of the present disclosure.

DETAILED DESCRIPTION

The technical solutions of embodiments of the present disclosure will be described below in conjunction with accompanying drawings.

Communication System

Figure 1:
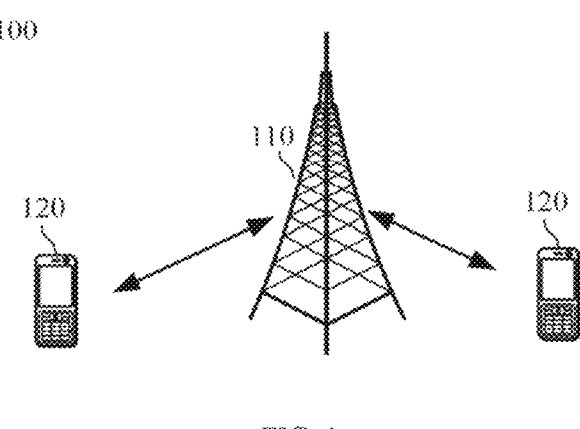
FIG. 1 is a schematic diagram of a wireless communication system according to some embodiments of the present disclosure.

FIG. 1 is a schematic diagram of a wireless communication system 100 according to some embodiments of the present disclosure. The wireless communication system 100 may include a network device 110 and a terminal device 120. The network device 110 may be a device that communicates with the terminal device 120. The network device 110 may provide communication coverage for a specific geographic region and may communicate with the terminal device 120 located within the coverage region.

FIG. 1 exemplarily illustrates one network device and two terminal devices. In some embodiments, the wireless communication system 100 may include multiple network devices and other numbers of terminal devices may be included within the coverage region of each network device, without limitation in the embodiments of the present disclosure.

In some embodiments, the wireless communication system 100 may further include other network entities such as a network controller, a mobile management entity, etc., without limitation in the embodiments of the present disclosure.

It should be understood that the technical solutions of embodiments of the present disclosure may be applied in various communication systems, for example, a 5th generation (5G) system or a new radio (NR), a long term evolution (LTE) system, a LTE frequency division duplex (FDD) system, a LTE time division duplex (TDD) system, etc. The technical solution solutions of embodiments of the present disclosure may also be applied in future communication systems, such as a 6th generation mobile communication system, a satellite communication system, and so on.

The terminal device in the embodiments of the present disclosure may also be referred to as a user equipment (UE), an access terminal, a user unit, a user station, a mobile station (MS), a mobile platform, a mobile terminal (MT), a remote station, a remote terminal, a mobile device, a user terminal, a terminal, a wireless communication apparatus, a user agent, or a user apparatus. The terminal device in the embodiments of the present disclosure may be a device that provides voice and/or data connectivity to the user, and may be configured to connect the user, an object, and a machine, such as a handheld device/a vehicle mounted device with wireless connection function, etc. The terminal device in the embodiments of the present disclosure may be a mobile phone, a tablet computer (Pad), a handheld computer, a mobile internet device (MID), a wearable device, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home. In some embodiments, the UE may be used as a base station. For example, the UE may act as a scheduling entity, and provide side link signals between UEs in Vehicle to everything (V2X) or in Device to Device (D2D), etc. For example, a cellular phone and cars communicate with each other by using the side link signals. The cellular phone communicates with a smart home device without the need to relay communication signals through the base station.

The network device in the embodiments of the present disclosure may be a device for communicating with the terminal device, and the network device may also be referred to as an access network device or a wireless access network device, such as a base station. The network device in the embodiments of the present disclosure may refer to a radio access network (RAN) or a node (or device) that connects the terminal device to the wireless network. The base station may broadly cover various names, or be replaced with the following names, such as a node B (NodeB), an evolved NodeB (eNB), a next generation NodeB (gNB), a relay station, an access point, a transmission and receiving point (TRP), a transmission point (TP), a main station MeNB, a secondary station SeNB, a Multi standard wireless (MSR) node, a home base station, a network controller, an access node, a wireless node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, etc. The base station may be a macro base station, a micro base station, a relay node, a donor node, or similar, or a combination thereof. The base station may also refer to a communication module, a modem, or a chip arranged in the above-mentioned apparatus or device. The base station may also be a mobile switching center, and a device responsible for a base station function in the D2D, in the (V2X), and in a machine to machine (M2M) communication, a network side device in a 6G network, a device responsible for a base station function in a future communication system. The base station may support a network with a same access technology or different access technologies. A specific technology and a device form adopted by the network device is not limited in the embodiments of the present disclosure.

The base station may be fixed or mobile. For example, a helicopter or an unmanned aerial vehicle may be configured to act as a mobile base station, and one or more cells may move based on a location of the mobile base station. In other embodiments, the helicopter or the unmanned aerial vehicle may be configured as a device for communicating with another base station.

In some deployments, the network device in the embodiments of the present disclosure may refer to the CU or the DU. Alternatively, the network device may include the CU and the DU. The gNB may further include the AAU.

The network device and the terminal device may be deployed on land, whether being indoor or outdoor, handheld, wearable or vehicle-mounted. The network device and the terminal device may also be deployed on water. The network device and the terminal device may also be deployed on an aircraft, a balloon, and in a satellite in the air. A scenario where the network device and the terminal device are disposed is not limited in the embodiments of the present disclosure.

It should be understood that, all or some of functions of the communication device in embodiments of the present disclosure may also be achieved through a software function running on a hardware, or through a virtualization function instantiated on a platform (such as a cloud platform).

Channel Estimation

Due to the complexity and time-variance of a wireless channel environment, in the wireless communication system, a receiver needs to recover a received signal based on an estimation result of a channel. The estimation and recovery of a wireless channel by the receiver directly affect final data recovery performance. FIG. 2 is a schematic diagram of channel estimation and signal recovery according to some embodiments of the present disclosure.

As shown in FIG. 2, in an operation S210, a transmitter not only transmits a data signal on a time-frequency resource, but also transmits a series of pilot signals known to the receiver, such as a channel state information reference signal (CSI-RS), a demodulation reference signal (DMRS), etc.

In an operation S211, the transmitter transmits the data signal and the pilot signal mentioned as above to the transmitter through the channel.

In an operation S212, the receiver may perform channel estimation after receiving the pilot signal. In some embodiments, the receiver may estimate channel information of a channel for transmitting the pilot signal, by using a channel estimation algorithm (such as least squares (LS) channel estimation), based on a prestored pilot sequence and a received pilot sequence.

In an operation S213, the receiver may recover channel information on a full-time frequency resource by using an interpolation algorithm according to channel information of the channel for transmitting the pilot sequence, and recovered channel information may be used for subsequent channel information feedback or data recovery.

Channel Feedback

In the wireless communication system, a channel feature is extracted and fed back mainly by using a codebook-based scheme. That is, after the receiver estimates the channel, a precoding matrix that best matches a current channel is selected from a pre-set precoding codebook based on a channel estimation result and according to certain optimization criteria, and a precoding matrix index (PMI) is fed back to the transmitter for precoding through a feedback link of an air interface. In some embodiments, the receiver may further provide feedback on a measured channel quality indication (CQI) to the transmitter for adaptive modulation and coding. The channel feedback may also be referred to as channel state information-reference signal (CSI) feedback.

Neural Network

In recent years, artificial intelligence (AI) research has achieved great results in many fields such as computer vision, natural language processing, etc., and the AI research will also play an important role in people's production and life for a long time in the future. A communication field has also begun to explore a new technical idea by using AI technology to solve a technical difficulty limited by a traditional method.

A neural network is an architecture commonly used in the AI. A common neural network includes a convolutional neural network (CNN), a recurrent neural network (RNN), a deep neural network (DNN), etc.

The neural network applicable to the embodiments of the present disclosure will be described below in conjunction with FIG. 3. The neural network shown in FIG. 3 may be divided into three categories based on positions of different layers: an input layer 310, hidden layers 320, and an output layer 330. Generally speaking, the first layer is the input layer 310, the last layer is the output layer 330, and an intermediate layer between the first and last layers is the hidden layers 320.

The input layer 310 is configured to input data. For example, taking a communication system as an example, input data may be a received signal received by the receiver. The hidden layers 320 are configured to process the input data, such as perform decompressing on the received signal. The output layer 330 is configured to output processed output data, such as output a decompressed signal.

As shown in FIG. 3, the neural network includes a plurality of layers, and each of the plurality of layers includes a plurality of neurons. The neurons between one of the plurality of layers and another of the plurality of layers may be fully connected or partially connected to each other. For connected neurons, output of the neuron in a previous layer may be served as input of the neuron in a next layer.

With the continuous development of neural network research, a neural network deep learning algorithm has been proposed in recent years. The neural network deep learning algorithm introduces a significant number of hidden layers in the neural network. Feature learning is performed by training the neural network with the plurality of hidden layers layer by layer, therefore greatly improved learning and processing capabilities of the neural network. The neural network model is widely used in pattern recognition, signal processing, optimization combination, anomaly detection, and other fields.

The CNN is a DNN with a convolutional structure, and the structure thereof is shown in FIG. 4. The CNN may include an input layer 410, convolutional layers 420, pooling layers 430, a fully connected layer 440, and an output layer 450.

Each convolutional layer 420 may include a plurality of convolution kernels. Each of the plurality of convolution kernels may also be referred as an operator, and act as a filter extracting specific information from an input signal. Each of the plurality of convolution kernels may essentially be a weight matrix, which is usually pre-defined.

Weight values in the weight matrices need a large amount of training in a practical application. Each of the weight matrices formed by the trained weight values may extract information from the input signal, thereby helping the CNN perform a correct prediction.

When the CNN has the plurality of convolutional layers, an initial convolutional layer often extracts more general features, and the general features may also be referred to as low-level features. As a depth of CNN deepens, features extracted by a convolutional layer disposed a more subsequent position become more and more complex.

Since the number of training parameters is needed to reduce, the pooling layer 430 often needs to be periodically introduced after the convolutional layer. For example, as shown in FIG. 4, it may be one convolutional layer followed by one pooling layer, or may be a plurality of convolutional layers followed by one or more pooling layers. A sole purpose of the pooling layer in a signal processing process is to reduce a spatial size of extracted information.

By introducing the convolutional layers 420 and the pooling layers 430, it may be possible to effectively control sharp increase of the network parameters, limit the number of the parameters, and explore characteristics of a local structure, thereby improving robustness of the algorithm.

After the fully connected layer 440 is processed by the convolutional layer 420 and the pooling layer 430, the CNN is not yet sufficient to output required output information. As mentioned above, the convolutional layers 420 and the pooling layers 430 only extract features and reduce the parameters brought by the input data. However, in order to generate final output information (such as bitstream of original information transmitted by a transmitting terminal), the CNN further needs to utilize the fully connected layer 440. Usually, the fully connected layer 440 may include a plurality of hidden layers, and parameters included in the plurality of hidden layers may be obtained by performing pretraining on relevant training data for a specific task type. For example, the task type may include decoding the data signal received by the receiver, or for example, the task type may further include channel estimation based on the pilot signal received by the receiver.

The output layer 450 disposed backward the plurality of hidden layers of the fully connected layer 440, namely, the last layer of an entire CNN, is configured to output a result. Usually, the output layer 450 is arranged with a loss function (such as a loss function similar to classification cross entropy) configured to calculate a prediction error, or to evaluate a degree of difference between an output result (which is also referred as a predicted value) of a CNN model and an ideal result (which is also referred as true values).

In order to minimize the loss function, it is necessary to train the CNN model. In some embodiments, the CNN model may be trained by using a backward propagation algorithm (BP). A training process of the BP includes a forward propagation process and a backward propagation process. In the forward propagation process (as shown in FIG. 4, a propagation from the input layer 410 to the output layer 450 is the forward propagation), the input data is input into each of the above-mentioned layers of the CNN model, and transmitted to the output layer after being processed layer by layer. If there is a significant difference between the output result and the ideal result in the output layer, minimizing the above loss function is served as an optimization objective, and the backwards propagation is turned on (as shown in FIG. 4, a propagation from the output layer 450 to the input layer 410 is the backward propagation). A partial derivative of the optimization objective on the weight value of each neuron is calculated layer by layer, a gradient of the optimization objective on a weight vector is formed, and the gradient may be served as a basis for modifying the weight of the model. A training process of the CNN is completed during a weight modification process. When the above error reaches an expected value, the training process of the CNN ends.

It should be noted that the CNN shown in FIG. 4 is only an example of the convolutional neural network. In some embodiments, the convolutional neural network may also exist in a form of other network models, which is not limited herein.

Autoencoder

An autoencoder is a type of an artificial neural network used in semi supervised and unsupervised learning. The autoencoder is a neural network that uses the input signal as a training target. The autoencoder may include an encoder and a decoder.

Taking an image compression shown in FIG. 5 as an example, the autoencoder will be described below.

The input to the encoder may be an image to be compressed. In the embodiment as shown in FIG. 5, the image to be compressed occupies 28×28=784 bits. After the image to be compressed is compressed by the encoder, a code stream is output. The number of bits occupied by the code stream output by the encoder is usually smaller than the number of bits occupied by the image to be compressed. For example, as shown in FIG. 5, the number of bits occupied by the code stream output by the encoder may be less than 784 bits. It can be learned from the foregoing that the encoder may achieve a compressed representation of the entity input to the encoder.

The input to the decoder may be a code stream. The code stream may be one output by the encoder. The output of the decoder is a decompressed image. As shown in FIG. 5, it may be seen that the decompressed image is consistent with the image to be compressed input by the encoder. Therefore, the decoder may achieve reconstruction of an original entity.

During a process of training the autoencoder, data to be compressed (such as the image to be compressed in FIG. 5) may be severed as the input (i.e., input to the encoder) and a label (i.e., output of the decoder) of the autoencoder, and joint training in an end-to-end manner is performed on the encoder and the decoder.

Neural Network-Based Channel Estimation and Recovery

At present, the communication system is considering using the AI to achieve channel estimation and recovery, such as the neural network-based channel estimation and recovery.

FIG. 6 is a schematic diagram of an AI-based channel estimation and recovery process.

An AI-based channel estimation and recovery module 610 may be a neural network. Input information of the AI-based channel estimation and recovery module 610 may be a reference signal, and output information may be a result of channel estimation and recovery.

It may be understood that the input information of the AI-based channel estimation and recovery module may further include at least one of: feature extraction of the reference signal, energy level, delay characteristics, noise characteristics, etc. The above information may be severed as other auxiliary information, so as to improve the performance of the AI-based channel estimation and recovery module.

Neural Network-Based Channel Feedback

Similar to the channel estimation, the channel feedback may also be achieved based on the AI, such as the neural network-based channel feedback. A network device side may restore the channel information fed back from a terminal device side as much as possible through neural network. The neural network-based channel feedback may achieve the restoration of channel information and provide the possibility of reducing channel feedback overhead on the terminal device side.

As an embodiment, the channel feedback may be achieved by using a deep learning autoencoder. For example, an AI-based channel feedback module may be achieved based on the autoencoder. The input of the AI-based channel feedback module may be channel information, that is, the channel information may be treated as the compressed image input to the autoencoder. The AI-based channel feedback module may compress and provide feedback on the channel information. At the transmitting terminal, the AI-based channel feedback module may reconstruct compressed channel information, thereby preserving the channel information to a large extent.

FIG. 7 is a schematic diagram of an AI-based channel feedback process. A channel feedback module shown in FIG. 7 includes an encoder and a decoder. The encoder and the decoder are deployed on a receiving terminal (Rx) and a transmitting terminal (Tx), respectively. The receiving terminal may obtain a channel information matrix through the channel estimation. The channel information matrix may be compressed and encoded through the neural network, and a compressed codeword is formed. The compressed codeword may be fed back to the receiving terminal through the feedback link of the air interface. The transmitting terminal may decode or recover channel information based on the feedback codeword through the decoder, thereby obtaining complete feedback channel information.

The AI-based channel feedback module may have a structure shown in FIG. 7. For example, the encoder may include several fully connected layers, and the decoder may include a residual network. It may be understood that FIG. 7 is only an example, and an internal network model structure of the encoder and the decoder is not limited herein. The structure of the network model may be flexibly designed.

From the above-mentioned introduction, it can be seen that the channel is of great significance for the communication system. With the development of technology, the communication system and the theoretical framework have shown some limitations, which poses a significant challenge to the channel modeling.

Firstly, it is difficult for a mathematic-based channel modeling method to accurately depict the increasingly complex channel environment. For example, the mathematic-based channel modeling method is not accurate enough in describing a channel environment such as a large-scale antenna, an underwater communication, and a millimeter wave. In addition, the combination and utilization of signal processing devices are becoming increasingly diverse, which brings nonlinear characteristics to a signal processing process. With respect to the nonlinear characteristics, a mathematic-based modeling signal processing method cannot well meet the high reliability requirement for communication. In addition, an iterative algorithm (such as a symbol detection) in the communication system also has high complexity, and the mathematic-based modeling method cannot well meet the high-speed communication requirement.

Due to a case that the AI model is not limited to a fixed mathematical theory or model, an AI-based wireless communication may solve the above problems to some extent. It can be learned from the foregoing that, an architecture of the AI is data-driven, that is, the training of an AI model requires high-quality and a large amount of training data to support. Therefore, the AI-based channel modeling method require a large amount of channel data to support. The channel data require manual use of specialized and expensive equipment to obtain in a real environment. The acquisition and collection of the channel data may consume a large amount of manpower, material resources, financial resources, and time.

The present disclosure provides a data processing method to solve the problem of the AI-based channel modeling requiring a large amount of channel data. FIG. 8 is a schematic flowchart of a data processing method according to some embodiments of the present disclosure. The method shown in FIG. 8 may be executed by a device arranged with an AI processing capability. The device may be, for example, the terminal device or the network device as mentioned above.

As shown in FIG. 8, in an operation S810, first channel data is generated by using a channel generator.

The channel generator may be configured to generate the first channel data. The first channel data may be configured to describe or depict a channel state. Therefore, the first channel data may also be understood as a channel model. Due to a case that the first channel data is not collected in the real environment, but is generated by the channel generator. Therefore, the first channel data may also be referred to as pseudo channel data or fake channel data. In other words, the first channel data may be analog data of real channel data.

The channel generator is included in a generative adversarial network (GAN). The GAN is a type of neural network and commonly configured for image processing. The generative adversarial network includes two sets of networks, namely a generator and a discriminator. The generator may be configured to generate the fake data similar to the real data. The discriminator may be configured to distinguish authenticity of data. A training objective of the generator is adversarial to that of the discriminator. Therefore, a training process of the GAN is a dynamic game process. During the game process, it may be possible to train the GAN based on a small amount of real data.

In the embodiments of the present disclosure, the generator in the GAN may be served as the channel generator (i.e., the generator generates the channel data or is configured for channel modeling), and the discriminator in the GAN may be served as a channel discriminator. The channel generator may be configured to receive the real channel data and generate the first channel data (or the pseudo channel data). The channel discriminator may be configured to discriminate the first channel data according to the real channel data.

During the training process of the GAN, it is necessary to train the channel generator and the channel discriminator simultaneously. A training objective of the channel generator is that the generated first channel data is more realistic, such that it is impossible for the channel discriminator to distinguish the authenticity of the first channel data. A training objective of a channel discriminator is to distinguish the first channel data from the real channel data. It can be learned from the foregoing that the training objective of the channel generator is adversarial to that of the channel discriminator. Therefore, the training process of the GAN in the present disclosure is a dynamic game between the channel generator and the channel discriminator. When the game reaches equalization (such as Nash equalization), the channel discriminator may confuse the real channel data with the first channel data, that is, the first channel data is enough to falsehood to be dressed up as truth. In this case, a pseudo channel distribution generated by the channel generator may well match a real channel distribution, thereby completing the channel modeling process.

Firstly, the channel generator provided by some embodiments of the present disclosure is included in the AI model, and the process of generating the channel data by the channel generator may be understood as an AI-based channel modeling process (the channel data is configured to describe the channel, and therefore, the generating channel data is equivalent to performing channel modeling). Therefore, compared with a traditional mathematic-based channel modeling method, the present embodiment may effectively depict various complex channel environments without being limited to a specific channel environment. Furthermore, the channel generator provided by some embodiments of the present disclosure is included in the generator in the GAN. The GAN is based on a game theory. By using a small amount of real channel data, the channel generator may generate a large amount of pseudo channel data that is highly similar to real channel data, thereby reducing manpower, material resources, financial resources, and time required to obtain and collect the real channel data.

In some embodiments, the first channel data may be served as training data to train one or some AI-based wireless communication models. The wireless communication model may be an AI-based (or neural network-based) channel processing module. The channel processing module may be any type of module with input data and/or output data including the channel data. For example, the channel processing module may include a channel feedback module and/or a channel estimation module.

Obviously, compared with the real channel data, using the first channel data as the training data for an AI-based channel processing module has many advantages. On the one hand, the first channel data is obtained through the generator, which is more convenient than manually obtaining the real channel data through the specialized equipment. On another hand, using the channel generator may save costs such as manpower and equipment configured for collecting the channel data. On yet another hand, the collection efficiency of the first channel data is more efficient. Using the first channel data to train the AI-based channel processing module may greatly reduce a cycle of model training.

An overall framework of a data processing method provided by some embodiments of the present disclosure will be described in detail below in conjunction with FIG. 9.

As shown in FIG. 9, the GAN includes a channel generator (which may be represented by $G(\bullet)$) and a channel discriminator (which may be represented by $D(\bullet)$).

The channel generator $G(\bullet)$ may generate first channel data H' based on a latent variable z. In some embodiments, the latent variable is also referred to as a potential variable. A method of obtaining the latent variable z is not limited herein. For example, the latent variable z may be randomly sampled from latent space. A form of the latent variable z may be determined based on actual needs. For example, the latent variable z may be a vector. A size of the latent variable z may also be flexibly selected. Taking the latent variable z as a vector, the latent variable z may be $128 \times 1$ dimensional vector.

Real channel data H may be sampled from a real channel training set. It may be understood that a plurality of real channel data H may be sampled through the real channel training set.

A representation form of the channel data is not limited herein. For example, the channel data may be a tensor or a matrix, etc. In an embodiment, the real channel data H may be a real channel tensor, and the first channel data H' may be a first channel tensor.

A channel discriminator D(•) is configured to determine whether the channel data input to the channel discriminator D(•) is true, that is, whether the output of the channel discriminator D(•) is true or false. The channel data input to the channel discriminator D(•) may include the first channel data H' and/or the real channel data H. For example, when the GAN is trained, the first channel data H' and the real channel data H may be input to the channel discriminator D(•). Alternatively, when the GAN is configured to discriminate whether channel data to be discriminated is true, the channel data to be discriminated may be input to the channel discriminator. At this time, the channel data to be discriminated may be either the real channel data H or the first channel data H'.

In some embodiments, the channel data input to the channel discriminator D(•) may be preprocessed. Preprocessing may include normalization processing, zero-padding processing, or cropping processing.

The normalization processing may limit amplitude of the channel data to be within a certain range. Therefore, the normalization may reduce complexity of the GAN computation, thereby improving processing efficiency of an adversarial generative network.

Taking the real channel data H being the real channel tensor as an example, a value of an element of the real channel tensor may be limited to be in a range of (−1, 1) by using the following formula:

$$N(H) = \left(\frac{1}{\max(H)}\right)H,$$

where max(•) represents a maximum amplitude in all elements of the input tensor, and N (H) represents a normalized real channel tensor.

The zero-padding processing or the cropping processing may convert the channel data to a predetermined size. For example, a size of an input channel tensor required by the channel discriminator D(•) is 128×128×2. When a size of the channel tensor is less than 128×128×2, the zero-padding processing may be performed to convert the channel tensor to a tensor of 128×128×2. Alternatively, when the size of the input channel tensor is greater than 128×128×2, the cropping processing may be performed to crop the channel tensor to a tensor of 128×128×2.

Model structures of the channel generator and the channel discriminator will be described in detail below in conjunction with FIGS. 10-14. It may be understood that FIGS. 10-14 are only examples, and the model structure of the channel generator or the channel discriminator is not limited herein. That is to say, the number of layers in the channel generator or the channel discriminator, a type of each layer, a parameter of each layer, the number of the neurons, and an activation function may all be flexibly selected according to actual situations.

FIG. 10 is a schematic structural diagram of a channel generator 1000 according to some embodiments of the present disclosure. The channel generator 1000 may include at least one of: a fully connected layer 1010, a batch normalization layer 1020, a dimension conversion layer 1030, an up-sampling block 1040, and a cropping layer 1050.

The fully connected layer 1010 may achieve batch normalization of the latent variable z for subsequent processing.

The dimension conversion layer 1030 may perform dimension conversion on data input to the dimension conversion layer. It may be understood that the GAN is commonly configured for image processing, and image data is usually a three-dimensional tensor, i.e., length multiplied by width multiplied by the number of channels. Therefore, the dimension conversion layer 1030 may convert the input data into a 3D tensor similar to the image data, and subsequent processing may be achieved by using a method similar to a GAN-based image processing technology.

The up-sampling block 1040 may include an up-sampling layer, a convolutional layer, etc. Therefore, the up-sampling block 1040 may not only perform up-sampling processing on the data, but also perform other processing on the data (such as convolutional processing). The channel generator 1000 may include one or more up-sampling blocks 1040. For example, the channel generator 1000 shown in FIG. 10 may include five up-sampling blocks 1040a~1040e. When the channel generator 1000 includes a plurality of up-sampling blocks 1040, a parameter of each up-sampling block may be the same as or different from each other. For example, the number of filters $N_f$ of the up-sampling blocks 1040a~1040e shown in FIG. 10 are different from each other. A structure of the up-sampling block 1040 in conjunction with FIG. 11 will be described in detail below, which will not be repeated herein.

The channel generator 1000 may further include a cropping layer 1050. The channel generator 1000 may also use the cropping layer 1050 to crop a size of the output first channel data H' to match a size of the real channel data H. Taking the channel data as a tensor, if a size of the real channel tensor H is 128×80×2, two-dimensional (2D) cropping may be performed by the cropping layer 1050, and a tensor of 128×128×2 is cropped to a tensor of 128×80×2 by using 2D cropping (0,24), so as to match the size of the real channel tensor H.

FIG. 11 is a schematic structural diagram of an up-sampling block according to some embodiments of the present disclosure. The up-sampling block 1040 may include at least one of: an up-sampling layer 1041, a convolutional layer 1042, a batch normalization layer 1043, and an activation function layer 1044.

A parameter of each layer of the up-sampling block 1040 may be flexibly selected. For example, a step size may be flexibly selected, as shown in FIG. 11. A step size of the up-sampling layer 1041 may be 2×2, and a step size of the convolutional layer 1042 may be 1×1.

A convolution kernel of the convolutional layer 1042 may be flexibly selected. For example, the convolution kernel thereof may be 3×3. The number of filters $N_f$ of the convolutional layer 1042 may be determined by a position where the up-sampling block 1040 is disposed in the channel generator 1000. The number of filters $N_f$ varies, and a feature size output by the up-sampling block also varies. Taking FIG. 10 as an example, a $N_f$ of the up-sampling block 1040a is 1024, and an output feature size is 8×8×1024. A $N_f$ of the up-sampling block 1040b is 512, and an output feature size is 16×16×512. A $N_f$ of the up-sampling block 1040c is 256, and an output feature size is 32×32×256. A $N_f$ of the up-sampling block 1040d is 128, and an output feature size is 64×64×128. A $N_f$ of the up-sampling block 1040e is 2, and an output feature size is 128×128×2.

The activation function layer 1044 may include an activation function. A type of the activation function is not limited in the present disclosure. For example, the activation function may be LeakyReLU, tan h, or the like. The activation function layer 1044 may include one or more activation functions. When the activation function layer 1044 includes a plurality of activation functions, an appropriate activation function may be selected according to needs. Taking FIG. 11 as an example, the activation function layer 1044 may include two optional activation functions, i.e., the LeakyReLU and the tan h. For the plurality of optional activation functions, they may be selected based on a flag Ar. Further taking FIG. 11 as an example, a value of the $A_f$ may be, for example, $A_f \in \{0,1\}$, where $A_f=0$ represents the use of the activation function LeakyReLU, and $A_f=1$ represents the use of the activation function tan h. The value of $A_f$ may be related to the position where the up-sampling block 1040 is disposed in the channel generator 1000. Taking the channel generator 1000 shown in FIG. 10 as an example, the first four up-sampling blocks 1040a~1040d may be set to $A_f=0$, that is, the up-sampling blocks 1040a~1040d use the activation function LeakyReLU. The last up-sampling block 1040e may be configured to be $A_f=1$, that is, the up-sampling blocks 1040e may use the activation function tan h. An amplitude range output by the tan h is (−1,1), therefore, by using the activation function tan h in the last up-sampling block, an amplitude of an element in the output channel tensor H' may be limited to be (−1,1).

A structure of the channel generator is described in the above text, and a structure of the channel discriminator will be described below in conjunction with FIGS. 12-13.

FIG. 12 is a schematic structural diagram of a channel discriminator 1200 according to some embodiments of the present disclosure. The channel discriminator 1200 may include at least one of: a zero-padding layer 1210, a down-sampling block 1220, a dimension conversion layer 123, and a fully connected layer 1240.

The input of the channel discriminator 1200 may be the real channel data H and/or the first channel data H'. The channel data input to the channel discriminator may be performed with a zero-padding processing to a specific dimension by the zero-padding layer 1210, so as to facilitate processing on a subsequent layer of the channel discriminator 1200.

The number of the down-sampling blocks 1220 may be one or more. For example, the channel discriminator 1200 shown in FIG. 12 includes six down-sampling blocks 1220a~1220f. When the channel discriminator 1200 includes a plurality of down-sampling blocks 1220, a parameter of each down-sampling block may be the same as or different from each other. As shown in FIG. 12, the number of filters $N_f$ of the down-sampling blocks 1220a~1220f are different from each other.

After passing through the down-sampling block, a feature map output by the down-sampling block may be flattened into a one-dimensional vector through the dimension conversion layer 1230. The one-dimensional vector may be converted into the output of a single element through the fully connected layer 1240. The single element is a determined result (true or false).

FIG. 13 is a schematic structural diagram of a down-sampling block 1220 according to some embodiments of the present disclosure. The down-sampling block 1220 may include at least one of: a convolutional layer 1221, an activation function layer 1222, and a batch normalization layer 1223.

A convolution kernel of the convolutional layer 1221 may be flexibly selected. For example, the convolution kernel thereof may be 5×5. The number of filters $N_f$ of the convolutional layer 1221 may be determined by a position where the down-sampling block 1220 is disposed in channel discriminator 1200. The number of filters $N_f$ varies, and a feature size output by the down-sampling block also varies. Taking FIG. 12 as an example, a $N_f$ of the down-sampling block 1220a is 32, and an output feature size is 64×64×32. A $N_f$ of the down-sampling block 1220b is 64, and an output feature size is 32×32×64. A $N_f$ of the down-sampling block 1220c is 128, and an output feature size is 16×16×128. A $N_f$ of the own-sampling block 1220d is 256, and an output feature size is 8×8×256. A $N_f$ of the down-sampling block 1220e is 512, and an output feature size is 4×4×512. A $N_f$ of the down-sampling block 1220f is 1024, and an output feature size is 2×2×1024.

The activation function layer 1222 includes an activation function. A type of the activation function is not limited by the present disclosure, for example, the activation function may be LeakyReLU.

A structure of the GAN provided by some embodiments of the present disclosure is described in detail in the above, and a training method and a testing method of the GAN will be described below.

In a process of training the GAN, a data processing method provided by some embodiments of the present disclosure may further include: an operation S820. In the operation S820, the GAN is trained according to a discrimination result of the channel discriminator.

During the training process, the channel generator and the channel discriminator perform adversarial training. In an embodiment, the training process may include a plurality of training cycles. In one training cycle, an operation S821 and an operation S822 may be included. In the operation S821, the parameter of the channel generator is frozen, and the channel discriminator is trained to distinguish the authenticity of the input channel data, that is, the training objective is to improve the accuracy of the channel discriminator in distinguishing the authenticity of channel data. In the operation S822, the parameter of the channel discriminator is frozen, and the channel generator is trained to "deceive" the channel discriminator, that is, the training objective is to reduce the accuracy of the channel discriminator in distinguishing the authenticity of channel data. During the training cycle, the operation S821 and the operation S822 may be alternated. When an equalization state is reached, the training is completed. That is, when the channel discriminator completely confuses the real channel with the channel generated by the channel generator, the generated pseudo channel distribution may better match the real channel distribution.

The use of a loss function is not limited by the present disclosure during the training process. For example, the following equation may be used as the loss function:

$$\min_{\{g\}} \max_{\{d\}} E[D(H)] - E[D(G(z))] - \lambda E\left[ (\|\nabla_{H''} D(H'')\|_2 - 1)^2 \right],$$

where H is the real channel, z is the latent variable, and $H''=\alpha H+(1-\alpha)G(z)$ follows a uniform distribution U[0,1], where $\lambda>0$.

The use of an optimizer during the training process is not limited by the present disclosure. For example, an adaptive momentum (Adam) optimizer may be configured to performing training on the GAN.

As mentioned above, the first channel data generated by the channel generator may be served as the training data for the channel processing module. Before using the first channel data for training, the first channel data may be tested to determine a quality of the first channel data, i.e., to determine whether the first channel data may achieve training of the AI-based channel processing module, or the accuracy of the first channel data.

In an embodiment, the channel processing module may be trained according to first real channel data, the channel processing module may be tested according to the first channel data, and a first test performance is obtained.

The first real channel data may be any one of channel data in a first real channel training set. A first real channel training set may include n pieces of real channel data. For example, the first real channel training set may be represented as $\{H_1, \ldots, H_n\}$, where $n>0$.

The first channel data may be any one of channel data in a pseudo channel testing set. The pseudo channel testing set may include m pieces of pseudo channel data. For example, the pseudo channel testing set may be represented as $\{H'_1, \ldots, H'_m\}$, where $m>0$. M latent variables may be sampled from the latent space and form a set $Z=\{z_1, \ldots, z_m\}$. A pseudo channel testing set may be generated by using a generator $G(\bullet)$, i.e., $\{H'_1, \ldots, H'_m\}=G(Z)$.

The testing channel processing module being an autoencoder model of an AI-based channel feedback is taken as an example. The model may be trained by using the real channel training set $\{H_1, \ldots, H_n\}$, and tested on the pseudo channel testing set $\{H'_1, \ldots, H'_m\}$ to obtain the first test performance. In some embodiments, the first test performance may also be referred to as a forward test performance.

In another embodiment, the channel processing module may be trained according to the first channel data, the channel processing module may be tested according to second real channel data, and a second test performance is obtained.

The first channel data may be any one of channel data in a pseudo channel training set. The pseudo channel training set may include n pieces of pseudo channel data. For example, the pseudo channel testing set may be represented as $\{H'_1, \ldots, H'_n\}$, where $n>0$. n latent variables may be sampled from the latent space and form a set $Z=\{z_1, \ldots, z_m\}$. A pseudo channel testing set may be generated by using a generator $G(\bullet)$, i.e., $\{H'_1, \ldots, H'_m\}=G(Z)$.

The second real channel data may be any one of channel data in a second real channel testing set. The second real channel testing set may include m real channels. For example, the first real channel training set may be represented as $\{H_{(n+1)}, \ldots, H_{(n+m)}\}$, where $m>0$.

The testing channel processing module being the autoencoder model of the AI-based channel feedback is taken as an example. The model may be trained by using the pseudo channel training set $\{H'_1, \ldots, H'_n\}$, and tested on the pseudo channel testing set $\{H_{(n+1)}, \ldots H_{(n+m)}\}$ to obtain the second test performance. In some embodiments, the second test performance may also be referred to as a reverse test performance.

According to the first test performance and/or the second test performance, the quality of the first channel data may be determined.

In some embodiments, the present disclosure provides a method for obtaining a test performance baseline to evaluate the first test performance or the second test performance. By comparing the first test performance or the second test performance with the test performance baseline, the quality of the first channel data may be determined.

As an embodiment, a channel processing module may be trained according to third real channel data; and the channel processing module is tested according to fourth real channel data, to obtain a baseline of the test performance of the channel processing module. The third real channel data may be any one in a third real channel training set $\{H_1, \ldots, H_n\}$ including n pieces of real channel data. The fourth real channel data may be any one in a fourth real channel testing set $\{H_{(n+1)}, \ldots, H_{(n+m)}\}$ including m pieces of real channel data. The autoencoder model of the AI-based channel feedback may be trained according to the third real channel training set, and the autoencoder model may be tested on the fourth real channel testing set to obtain a test performance baseline.

It may be understood that when the first test performance is close to the test performance baseline, the effectiveness and accuracy of the first channel data generated by the channel generator are higher. When the second test performance is close to the test performance baseline, the first channel data generated by the channel generator may support the training of the channel processing module.

The method embodiments of the present disclosure are described in detail in conjunction with FIGS. 1-13, and device embodiments of the present disclosure will be described in detail below in conjunction with FIGS. 14-15. It should be understood that the device embodiments and the method embodiments correspond to each other, and therefore, a part that is not described in detail may refer to the previous method embodiments.

FIG. 14 is a schematic structural diagram of a data processing apparatus 1400 according to some embodiments of the present disclosure. The data processing apparatus 1400 may include a generation unit 1410.

The generation unit 1410 may be configured to generate first channel data by using a channel generator, and the channel generator is included in a GAN. The GAN further includes a channel discriminator configured to discriminate the first channel data based on real channel data.

In some embodiments, the data processing apparatus 1400 further includes a first training unit 1420. The first training unit 1420 may be configured to train the GAN according to a discrimination result of the channel discriminator.

In some embodiments, the data processing apparatus 1400 further includes a second training unit configured to train an AI-based channel processing module according to the first channel data.

In some embodiments, the data processing apparatus 1400 further includes: a third training unit configured to train the channel processing module according to the first real channel data; and a first testing unit configured to test the channel processing module according to the first channel data and obtain a first test performance of the channel processing module.

In some embodiments, the data processing apparatus 1400 further includes a fourth training unit configured to train a channel processing module according to the first channel data.

The data processing apparatus 1400 further includes a second testing unit configured to test the channel processing module according to second real channel data and obtain a second test performance of the channel processing module.

In some embodiments, the data processing apparatus 1400 further includes: a fifth training unit configured to train the channel processing module according to third real channel data; a third testing unit configured to test the channel processing module according to fourth real channel data and obtain a baseline of a test performance of the channel processing module.

In some embodiments, the channel processing module includes: a channel feedback module and/or a channel estimation module.

FIG. 15 is a schematic structural diagram of a device for data processing according to some embodiments of the present disclosure. A dashed line shown in FIG. 15 indicates that the unit or module is optional. A device 1500 may be configured to perform the method described in the above embodiments. The device 1500 may be a chip, a terminal device, or a network device.

The device 1500 may include one or more processors 1510. The processor 1510 may support the device 1500 to perform the methods described in the previous method embodiments. The processor 1510 may be a general-purpose processor or a dedicated processor. For example, the processor may be a central processing unit (CPU). Alternatively, the processor may also be other general-purpose processors, a digital signal processor (DSP), an application specific integrated circuit (ASIC), a field programmable gate array (FPGA), or other programmable logic device, discrete gate or transistor logic device, or discrete hardware component, etc. The general-purpose processor may be a microprocessor or the processor may also be any conventional processor, etc.

The device 1500 may further include one or more memories 1520. A program is stored on the memory 1520, and may be executed by the processor 1510, so as to cause the processor 1510 to perform the method described in the above-mentioned embodiments. The memory 1520 may be a separate device from the processor 1510 or may be integrated in the processor 1510.

The device 1500 may further include a transceiver 1530. The processor 1510 may communicate with another device or a chip through the transceiver 1530. For example, the processor 1510 may transmit and receive data with the other device or the chip through the transceiver 1530.

The present embodiment further provides a computer-readable storage medium configured to store a program. The computer-readable storage medium may be applied to the terminal device or the network device provided by the embodiments of the present disclosure, and the program enables the computer to perform the method performed by the terminal device or the network device in each embodiment of the present disclosure.

The present embodiment further provides a computer program product. The computer program product includes a program. The computer program product may be applied to the terminal device or the network device provided by the embodiments of the present disclosure, and the program enables the computer to perform the method performed by the terminal device or the network device in each embodiment of the present disclosure.

The present embodiment further provides a computer program. The computer program may be applied to the terminal device or the network device provided by the embodiments of the present disclosure, and the computer program enables the computer to perform the method performed by the terminal device or the network device in each embodiment of the present disclosure.

It should be understood that the terms "system" and "network" are often used interchangeably in this document. The terms used in embodiments of the present disclosure are only used to explain embodiments of the present disclosure, and are not intended to limit the present disclosure. The terms "first", "second", "third" and "fourth" in the description, claims and the drawings of the present disclosure are used to distinguish different objects, rather than to describe a specific order. In addition, the terms "include" and "have" and any deformation thereof are intended to cover non-exclusive inclusion.

In the embodiments of the present disclosure, the referred "indication" may be a direct indication, an indirect indication, or a representation of a related relationship. For example, A indicates B, which may indicate that A directly indicates B, for example, B may be obtained through A; It may also indicate that A indirectly indicates B, for example, A indicates C, and B may be obtained through C; It may also indicate a correlation between A and B.

In the embodiments of the present disclosure, "B corresponding to A" indicates that B is associated with A, and B may be determined based on A. However, it should also be understood that determining B based on A does not mean determining B solely based on A, but may also be determined based on A and/or other information.

In the description of embodiments of the present disclosure, the term "correspond" may indicate that there is a direct or indirect correspondence between the two, or that there is an association between the two, or that there is a relationship between indicating and being indicated, configurating and being configured.

In embodiments of the present disclosure, "predefined" or "preconfigured" may be achieved by pre-storing corresponding codes, tables, or other means that can be used to indicate relevant information in the device (e.g., including terminal devices and network devices), and the present disclosure is not limited to its specific implementation. For example, the "preset" may refer to being defined in a protocol.

In embodiments of the present disclosure, the "protocol" may refer to standard protocols in the field of communication, which may include, for example, LTE protocol, NR protocol, and related protocols applied in future communication systems, which is not limited.

The term "and/or" in the embodiments of the present disclosure is only a description of an association relationship of associated objects, indicating that three relationships may exist, for example, A and/or B, which may indicate: the existence of A alone, the existence of both A and B, and the existence of B alone. In addition, the character "/" generally indicates that the front and rear associated objects are in an "or" relationship.

It should be understood that in various embodiments of the present disclosure, the serial numbers of the processes do not imply the order of execution, and the order of execution of the processes shall be determined by their function and intrinsic logic, and shall not constitute any limitation to the processes implemented in the embodiments of the present disclosure.

In the several embodiments provided in present disclosure, it should be understood that, the disclosed system, device, and method may be implemented in other ways. For example, the device described above are merely illustrative. For example, the division of the units is only a logical function division, and there may be other divisions in actual implementation. For example, multiple units or components can be combined or can be integrated into another system, or some features can be ignored or not implemented. In addition, the displayed or discussed mutual coupling, direct coupling, or communication connection may be indirect coupling or communication connection through some interfaces, devices or units, and may be in electrical, mechanical, or other forms.

The units described as separate components may or may not be physically separated, and the components displayed as units may or may not be physical units. That is, they may be located at one position, or they may be distributed on multiple network units. Some or all of the units may be selected according to actual needs to achieve the objectives of the solutions of the embodiments.

In addition, the functional units in various embodiments of the present disclosure may be integrated into one processing unit, or each unit may exist alone physically, or two or more units may be integrated into one unit.

In the above-mentioned embodiments, it may be implemented in whole or in part by software, hardware, firmware or any combination thereof. When implemented by software, it may be implemented in the form of a computer program product in whole or in part. The computer program product includes one or more computer instructions. When a computer program instruction is loaded and implemented on the computer, the flow or function according to the embodiment of the present disclosure is generated in whole or in part. The computer may be a general-purpose computer, a special purpose computer, a computer network, or other programmable device. The computer instruction may be stored in a computer-readable storage medium, or transferred from one computer-readable storage medium to another computer-readable storage medium. For example, the computer instruction may be transferred from a website, a computer, a server or a data center to another website, computer, server or data center through wired (such as a coaxial cable, an optical fiber, a digital subscriber line (DSL)) or wireless (such as infrared, wireless, microwave, etc.). The computer-readable storage medium may be any available medium that may be accessed by the computer or is a data storage device including a server integrated with one or more available medias, a data center, etc. The available media may be a magnetic media (for example, floppy disk, hard disk, magnetic tape), an optical media (for example, DVD), or a semiconductor media (for example, solid state disk, SSD), etc.

The foregoing is only a specific implementation of the present disclosure, but the scope of the present disclosure is not limited thereto, and any changes or substitutions that can be readily thought of by those skilled in the art within the scope of the technology disclosed in the present disclosure shall be covered by the scope of the present disclosure. Therefore, the scope of the present disclosure shall be stated to be subject to the scope of the claims.

What is claimed is:

1. A data processing method, comprising:
   generating first channel data by using a channel generator, wherein the channel generator is comprised in a generative adversarial network (GAN), the GAN further comprises a channel discriminator configured to discriminate the first channel data according to real channel data, and the first channel data is configured to describe or depict a channel state;
   wherein the method further comprises:
   training a channel processing module according to first real channel data; and testing the channel processing module according to the first channel data and obtaining a first test performance of the channel processing module;
   training the channel processing module according to the first channel data; and testing the channel processing module according to second real channel data and obtaining a second test performance of the channel processing module;
   training the channel processing module according to third real channel data; and testing the channel processing module according to fourth real channel data and obtaining a baseline of test performance of the channel processing module; and
   determining quality of the first channel data by comparing the first test performance or the second test performance with the baseline.

2. The method according to claim 1, further comprising:
   training the GAN according to a discrimination result of the channel discriminator.

3. The method according to claim 1, further comprising:
   training an Artificial Intelligence (AI)-based channel processing module according to the first channel data.

4. The method according to claim 3, wherein the channel processing module comprises a channel feedback module and/or a channel estimation module.

5. A data processing device, comprising a processor and a memory; wherein the memory is configured to store a program, and the processor is configured to call the program stored in the memory to perform:
   generating first channel data by using a channel generator, wherein the channel generator is comprised in a generative adversarial network (GAN), the GAN further comprises a channel discriminator configured to discriminate the first channel data according to real channel data, and the first channel data is configured to describe or depict a channel state;
   wherein the processor is further configured to call the program stored in the memory to perform:
   training a channel processing module according to first real channel data; and testing the channel processing module according to the first channel data and obtaining a first test performance of the channel processing module;
   training the channel processing module according to the first channel data; and testing the channel processing module according to second real channel data and obtaining a second test performance of the channel processing module;
   training the channel processing module according to third real channel data; and testing the channel processing module according to fourth real channel data and obtaining a baseline of test performance of the channel processing module; and
   determining quality of the first channel data by comparing the first test performance or the second test performance with the baseline.

6. The data processing device according to claim 5, wherein the processor is configured to call the program stored in the memory to further perform:
   training the GAN according to a discrimination result of the channel discriminator.

7. The data processing device according to claim 5, wherein the processor is configured to call the program stored in the memory to further perform;
   training an Artificial Intelligence (AI)-based channel processing module according to the first channel data.

8. The data processing device according to claim 7, wherein the channel processing module comprises a channel feedback module and/or a channel estimation module.

9. A computer-readable storage medium configured to store a program, wherein the program is capable of causing a computer to perform:
   generating first channel data by using a channel generator, wherein the channel generator is comprised in a generative adversarial network (GAN), the GAN further comprises a channel discriminator configured to discriminate the first channel data according to real channel data; and the first channel data is configured to describe or depict a channel state;

wherein the program is further capable of causing a computer to perform:

training a channel processing module according to first real channel data; and testing the channel processing module according to the first channel data and obtaining a first test performance of the channel processing module;

training the channel processing module according to the first channel data; and testing the channel processing module according to second real channel data and obtaining a second test performance of the channel processing module;

training the channel processing module according to third real channel data; and testing the channel processing module according to fourth real channel data and obtaining a baseline of test performance of the channel processing module; and determining quality of the first channel data by comparing the first test performance or the second test performance with the baseline.

10. The computer-readable storage medium according to claim 9, wherein the program is capable of causing the computer to further perform:

training the GAN according to a discrimination result of the channel discriminator.

11. The computer-readable storage medium according to claim 9, wherein the program is capable of causing the computer to further perform:

training an Artificial Intelligence (AI)-based channel processing module according to the first channel data.

12. The computer-readable storage medium according to claim 11, wherein the channel processing module comprises a channel feedback module and/or a channel estimation module.

* * * * *